8737½x
S. S. Allen,
Horse Power.
Patented Apr. 3, 1835.
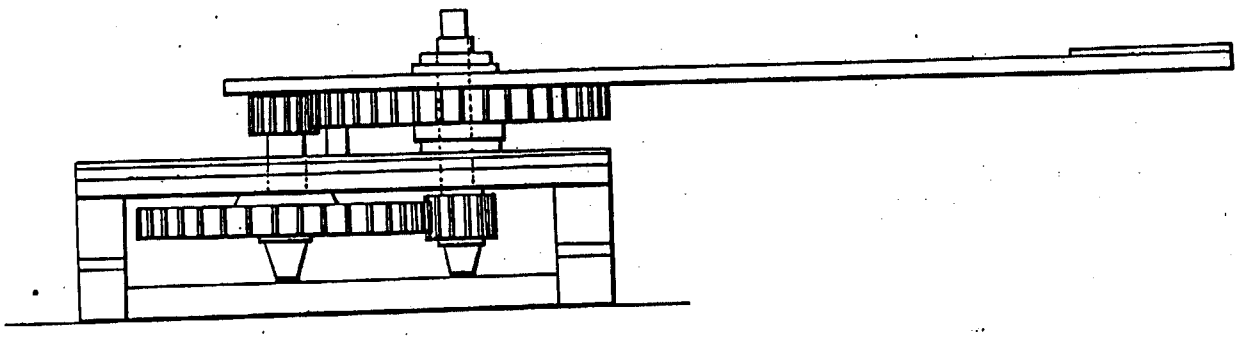
A.M. PHOTO-LITHO. CO. N.Y. (OSBORNE'S PROCESS)

Samuel S. Allen:

8737 1/2 X Letters Patent.

The Schedule referred to in these Letters Patent and making part of the same containing a description in the words of the said Samuel S. Allen, himself of his improvment in the Machine for thrashing grain, and for hulling and cleaning Clover and other seeds.—

---

To all whom it may concern.

Be it known that I Samuel S. Allen, of Saratoga Springs in the County of Saratoga, and State of New York, have invented an improved Machine for the purpose of thrashing Grain, and hulling and cleaning seeds; and I do hereby declare that the following is a full and exact description thereof. A frame is to be made to sustain a cylinder and concave in the manner in which frames are ordinarily made for such Machines, A principle point of difference between my Machine and those here=tofore constructed for similar purposes consists in the manner in which I form my concave, and by which it is readily adapted to the purpose of either thrashing or hulling and may be made to act upon the grain to be thrashed for a greater or lesser period of time according to its nature or the state of the weather.— To the inner sides of the frame I attach two semicircles of cast iron, one on each side, which semicircles are to receive the slats or staves of which the concave consists. In a Machine of which I have con=structed these semicircular rims are five inches wide, and seven=teen inches in diameter; they have on their insides two fillets or ridges which project inwards, and form a groove to receive and retain the slats above alluded to; they are bolted to the sides of the frame in such a way that they can be raised or lowered at pleasure, The slats or staves which constitute the concave must be of strong plank of such thickness as to receive and hold the teeth which are to be driven into them, and

3/4.

8737 1/2 X and they may be of such width that about twelve of them when
placed in the circular groove will fill the semicircle, when used
for thrashing the concave bed may extend round from the
bottom to the feeding table, and from about one fifth of a circle,
but the number of slats may be diminished or increased depending
upon the ripeness and dryness of the grain, when used for hulling
clover or other similar seeds, the whole of the semicircles may be
filled with slats. — The cylinder is to be made of wood in the usual
way, and teeth are to be driven into the cylinder and concave, in
the following manner. Each slat is to be divided lengthwise by
drawing thereon two parallel lines, about one inch apart, and
transverse lines at the distance of about one inch and eight a-
part, from end to end. The teeth are then to be set at the inter-
sections of these lines in the following manner commencing
at the end of the first row in the first slat, and setting a tooth
in every other cross line alternately setting one and missing one;
the second row then commences in the second line so that the
teeth in this shall follow the blanks in the first row; and this
manner of setting is to be continued throughout all the pieces
forming the concave. — The teeth may be cut from 3/8 rod iron, and
are to project out about one inch, they may be either square or
round, in the bed however, I prefer to use the square, excepting
in two or three of the first rows, as the straw is then lapped as
it is drawn in, In order to give them greater strength, I set the
first rows double; this may be done by setting a row of square
teeth, and immediately in front of them a row of round ones
leaning or raking back, so that the outer ends of the two are in
contact. The teeth throughout, are not to stand vertically,
but are to incline back at an angle of ten or fifteen degrees, accor-
ding to the judgment of the builder the exact rake not being impor-
tant, the object of this is to prevent the cutting and tearing of the straw
but in accomplishing this it is necessary to be careful not to give
such a rake as would allow the straw to pass too readily through the Machine.

The

8737 ½X

The cylinder is to be divided into circles corresponding with those on the bed piece, or concave, and twelve parallel equidistant lin are then to be drawn from end to end; in the intersections of these lines the teeth are to be placed, alternately in every third circle, setting one and missing two; the second parallel line should commence one tooth back of the first, so as to follow a blank, the third row commences in the third circle, and so on throughout the whole. I prefer to set the whole of these teeth double, in which case a square tooth may be first set vertically and then a round one leaning back against it at a proper rake, for the same purpose as in the bed — I cover the cylinder with sheet iron, first boring the holes in the wood for the teeth, and and afterwards punching through the sheet iron to set them. The feeding table is like those in common use — I have already stated that for hulling the concave bed is to be widened out in doing this I have found it advantageous to make the teeth of greater breadth in the two or three last additional rows to to cause the rubbing to be more completely performed; and instead of the iron teeth, in this part, I sometimes employ piece of raw hide. It is scarcely necessary to observe that in drawing the circles and setting the teeth, care must be taken that those on the cylinder will pass between those in the concave. When seed is to be hulled a hopper is to be placed above the cylinder provided with a slide, or shove board to regulate the feed, the seed being placed in the hopper is carried round the semicir=cular bed, and delivered at the back of the machine at about the centre of the cylinder where it falls down an inclined board under which is a fan wheel, by which the seed and chaff are separa=ted. I have in the foregoing machine described many parts of which I do not claim to be the inventor, and I have, in some instances mentioned the dimensions of certain parts, which however admit of much variation according to the size of the machine, and the power to be employed in driving it. All that

I

376.

8737 1/2X

I claim as my invention is the employment of the semicircu[illegible]
plates or other contrivance by which a semicircular groove can b[illegible]
formed, admitting of the increase or diminution of the concave b[illegible]
in the manner and for the purposes described, adapting the [illegible]
machine, by this means, to the better thrashing of grain in its diffe[illegible]
ent states – And also to the hulling and cleaning of clover an[illegible]
other seeds. —.

Witnesses
Ed. John Brandon
N.G. Saml. Stettinius

Samuel S. Allen

1400 [illegible]

(Drawing)

Patented. April 3. 1835.